United States Patent [19]
Nash-Stevenson et al.

[11] Patent Number: 5,182,789
[45] Date of Patent: Jan. 26, 1993

[54] OPTICAL FIBER HOLDER

[75] Inventors: Shelia K. Nash-Stevenson, Madison; Dennis M. Stockbridge, Huntsville, both of Ala.

[73] Assignee: Hughes Aircraft Company, Los Angles, Calif.

[21] Appl. No.: 541,105

[22] Filed: Jun. 20, 1990

[51] Int. Cl.⁵ ............................................. G02B 7/00
[52] U.S. Cl. ...................................... 385/137; 385/65; 385/96; 385/98
[58] Field of Search ................. 350/96.2, 96.21, 96.22; 385/96, 97, 98, 63, 65, 136, 137

[56] References Cited

U.S. PATENT DOCUMENTS

| | | | |
|---|---|---|---|
| 4,605,280 | 8/1986 | Welber et al. | 350/96.23 X |
| 4,750,804 | 6/1988 | Dsaka et al. | 350/96.22 X |
| 4,997,255 | 3/1991 | Lukas et al. | 350/96.2 X |
| 5,002,351 | 3/1991 | Szanto et al. | 385/96 |

FOREIGN PATENT DOCUMENTS 0171664 2/1986 European Pat. Off. .
63-198006 12/1988 Japan .

*Primary Examiner*—John D. Lee
*Assistant Examiner*—S. W. Barns

[57] ABSTRACT

An optical fiber holder 10 has a base 20 which has at least one groove 24 for retaining a fiber 13, which groove 24 is optimally slightly smaller than the cross-sectional area of the optical fiber 13. The top of the groove 24 is slightly larger than the diameter of the fiber 13. A strand retaining plate 30 is spring biased to additonally secure the fiber 13 when the plate 30 is placed over the fiber 13. The base 20 may be securely fixed in place. To fuse two fibers 13, two optical fiber holders 10 may be placed facing each other with the end of a fiber 13 extending from each. When fusing is to be performed by laser, the pair of apparatus may be securely placed at the proper distance from the laser beam as well as at the proper distance with respect to one another.

9 Claims, 3 Drawing Sheets

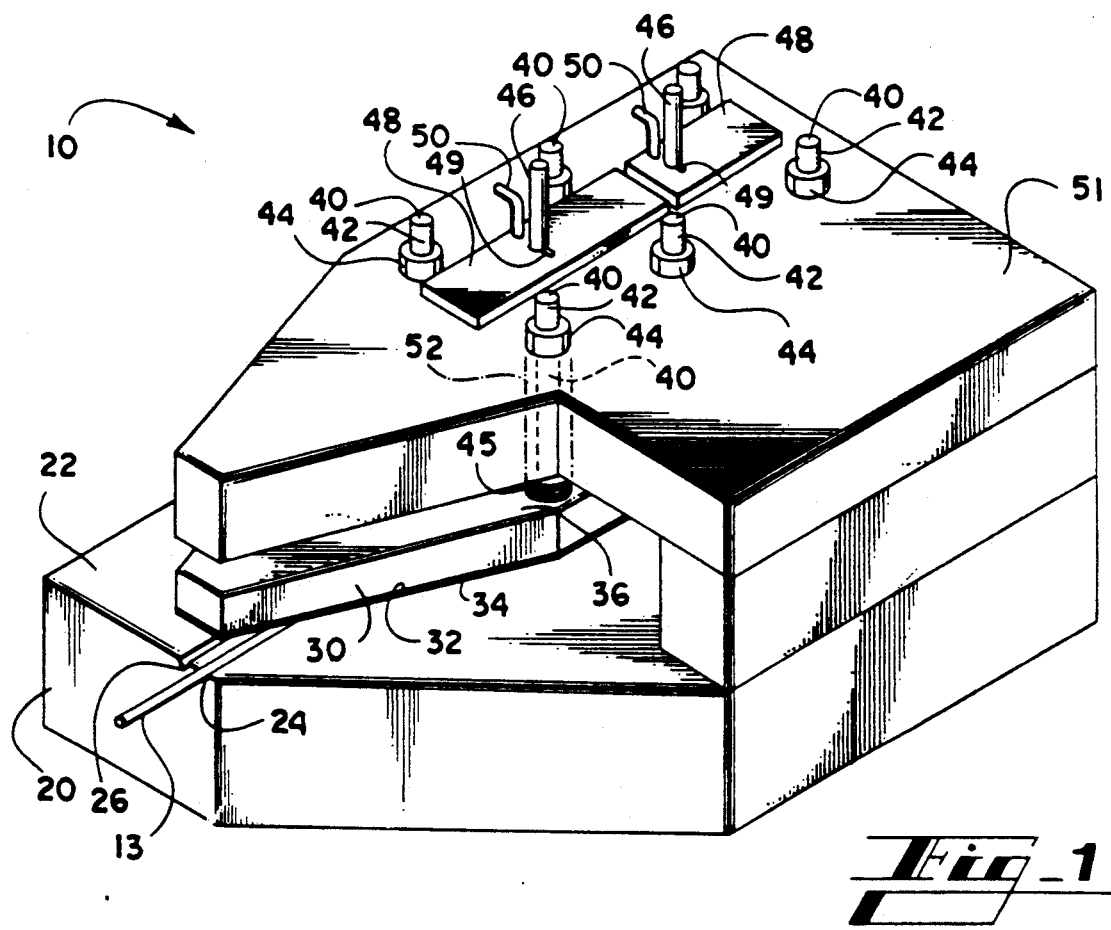
Fig_1
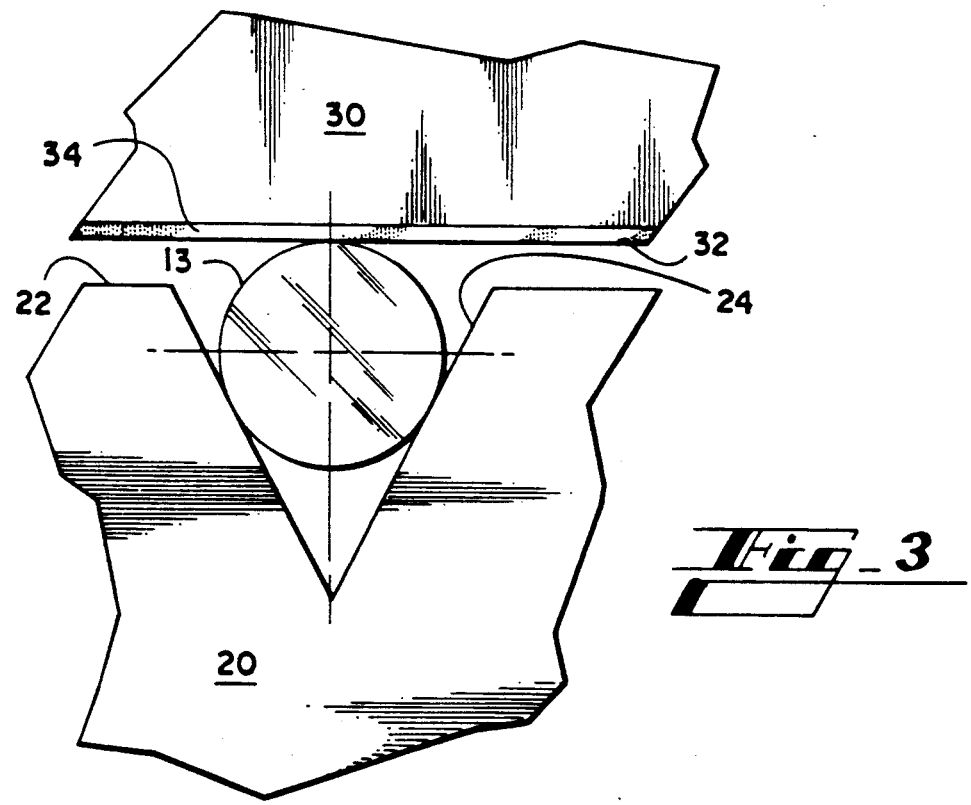
Fig_3

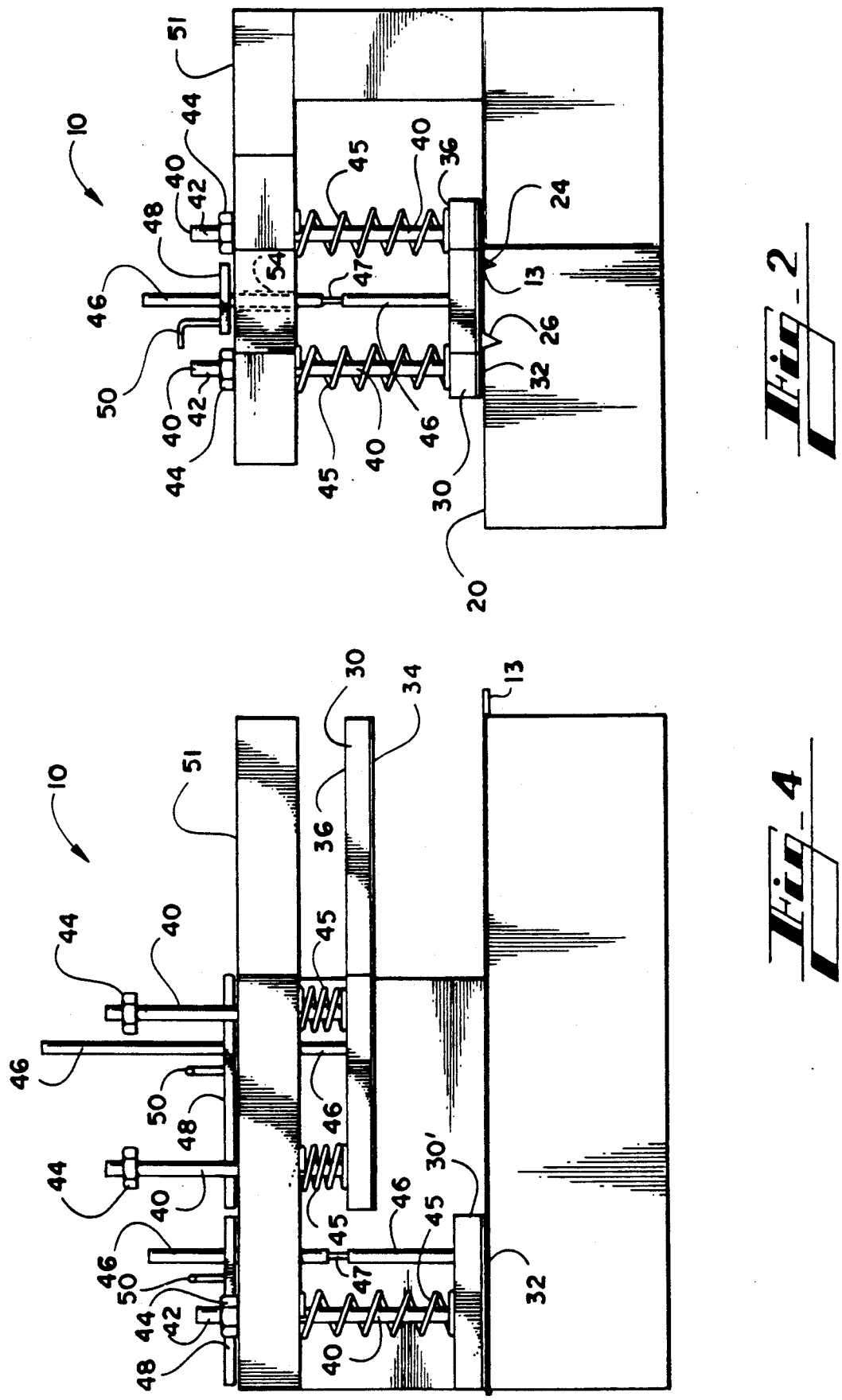

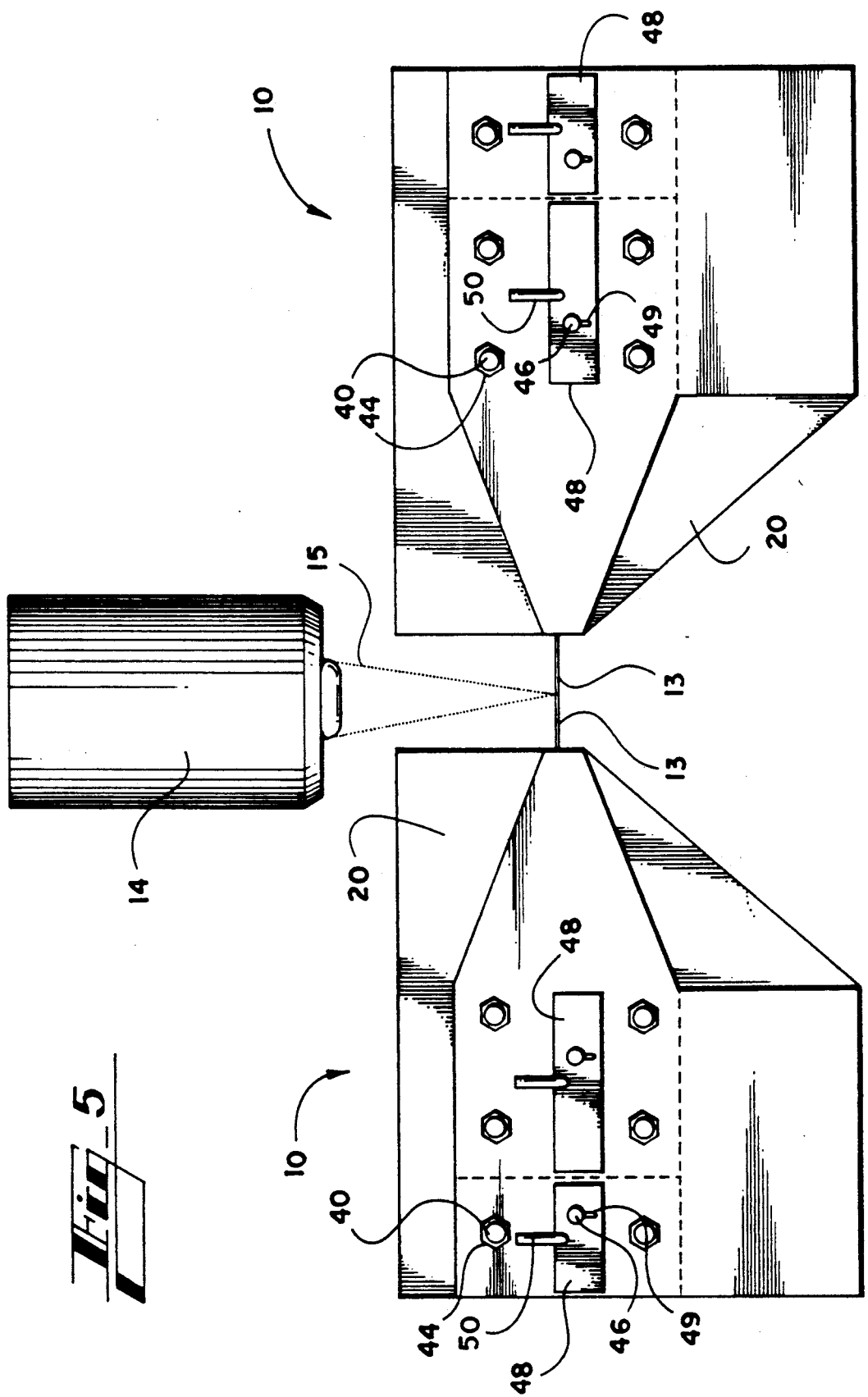

OPTICAL FIBER HOLDER

TECHNICAL FIELD OF THE INVENTION

The invention relates to apparatus for holding optical fibers while they are spliced, and more particularly to spring-loaded apparatus of this nature.

BACKGROUND OF THE INVENTION

As is generally known, in various fiber optics technologies, light beams are used to propagate electromagnetic energy through fibers. The fibers are cylindrical strands or filaments made from glass or plastic. The terms "strand," "filament," "optical fiber," and "fiber" will be hereinafter used interchangeably.

Fiber optics is based upon physics principles of refraction. Refraction is the bending of a beam or wave of light as it passes obliquely from one medium to another medium of density different than the first. There is a principle of refraction known as "total internal reflection." Total internal reflection means that light is "reflected" rather than "refracted." When a beam of light is incident to an interface between two mediums at an angle greater than the "critical angle," the beam is said to undergo "total internal reflection." The "critical angle" is the angle at which light striking the interface is not refracted or reflected but travels along the interface. When light strikes the interface at an angle less than the critical angle refraction occurs. When light strikes the interface at an angle greater than the critical angle, all of the light is reflected back through the same medium, that is to say, "total internal reflection" occurs.

As a beam of light is continually reflected at angles of incidence greater than a critical angle of the medium, light (and the electromagnetic energy which it carries) is propagated along the length of the fiber. If light is refracted outside of the fiber, the light and the electromagnetic energy which it carries are not propagated along the fiber as desired. Necessary angles of incidence will be maintained within proper limits as long as the inner surface of the fiber is essentially smooth, is continuous and does not contain sharp angles. Thus, the fiber itself must be continuous and not bent at sharp angles.

To create a fiber of desired length it is often necessary to join distinct segments of fiber to one another by fusing their end surfaces together. This process is commonly referred to as "splicing." The fusing agent in splicing is very often a laser beam which is focused upon the two end surfaces of strands which are to be joined.

A problem that arises in splicing optical fibers is that it is difficult to align and maintain alignment of the end surfaces which are to be joined so that the resulting spliced fiber is continuous and not bent at sharp angles.

The problem of maintaining fibers in precise alignment is even more significant when they are to be fused by a laser beam. In the typical situation of fusion by laser, fusion is accomplished by placing the two ends of optical fibers to be spliced at the focal point of the laser. Thus, it is very important that the ends to be spliced be properly aligned with respect to the laser as well as with respect to one another. If multiple splices are to be performed, the operation will not be efficient unless each pair of strands can be quickly and accurately aligned for fusion.

A current known method of aligning and securing optical fibers for splicing is not reliable or efficient. That method comprises placing a strand in an arbitrarily-sized groove in a metal base. If the groove is too large or too small, the fiber will not be adequately secured. The metal base is not secured and may be accidentally moved, disrupting alignment. The strand is secured by placing a magnetic weight over the strand. Magnetic attraction between the weight and base is usually either too small to adequately secure the fiber or too great to allow for ease of removal or manipulation of the weight. This method and apparatus employed does not optimally secure an optical fiber for alignment and splicing, does not enable pairs of end pieces to be easily and quickly secured and aligned with respect to each other and with respect to the laser beam, and does not provide for reliable, repeatable splicing.

BRIEF SUMMARY OF THE INVENTION

It is an object of the invention to provide a simple, reliable means for securing and aligning optical fibers for splicing.

It is also an object that securement and alignment be quickly and easily achievable and repeatable.

According to a broad aspect of the invention, a base has at least one groove which is optimally sized to be slightly smaller than the cross-sectional area of an optical fiber. The top of the groove is slightly larger than the diameter of the fiber although the groove itself is smaller than the cross-sectional area of the fiber. This causes a fiber to securely rest within the groove but slightly protrude above the top. A strand retaining plate extends from a support connected to the base and is spring biased to secure the fiber when the plate is placed over it. The spring-loaded retaining plate presses upon the protruding portion of the fiber, additionally securing it. The base may be securely fixed in place.

Two of the above-described apparatus may be placed facing each other with the end of a fiber extending from each. Alignment of the two apparatus and the fiber each secures is easily achieved. Quick alignment may then be easily repeated. When fusing is to be performed by laser, the pair of apparatus may be securely placed at the proper distance from the laser beam as well as at the proper distance with respect to one another. Once all of these proper distances are ascertained and the apparatus are secured at those distances, fibers may be quickly and repeatedly placed in the apparatus and fused by laser. The invention facilitates a high rate of splicing as well as splices which are more reliable and dependable in strength.

Other aspects, objects, features and advantages of the present invention will become apparent to those skilled in the art upon reading the detailed description of preferred embodiments in conjunction with the accompanying drawings and appended claims.

DESCRIPTION OF THE DRAWINGS

FIG. 1 is an isometric view of an apparatus for securing optical fibers embodying the teachings of the present invention.

FIG. 2 is an end view of the apparatus of FIG. 1.

FIG. 3 is an enlarged partial end view of one of the grooves of the apparatus of FIG. 1.

FIG. 4 is a front elevational view of the apparatus of FIG. 1.

FIG. 5 is a top view of two apparatus of FIG. 1 juxtaposed to splice two fibers via a laser beam.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described by reference to the following description of a preferred embodiment taken in conjunction with the accompanying drawings. Throughout the drawings, the same numerals have been used to refer to like features.

An apparatus for securing optical fibers according to a preferred embodiment of the invention is shown in FIG. 1. The base 20 of the apparatus 10 has a top surface 22 for receiving optical fibers. Grooves, and in this instance a V-shaped groove 24 and an alternate V-shaped groove 26, extend across the top surface 22 of the base 20. The groove 24 provides a secure resting place for a strand 13 which is to be manipulated and spliced. The alternate groove 26 serves the same purpose as the other groove 24 but is sized to accommodate strands which are not optimally secured by the other groove 24. Each groove 24 and 26 is shaped such that the top opening is wide enough to allow for the easy insertion of a strand 13 and shallow enough to cause the strand 13 to protrude slightly above the top of the groove 24 or 26 and the top surface 22 of the base 20. This is accomplished by employing a V-shaped groove 24 or 26 which has a top opening of slightly larger width than the diameter of strands which will be placed in the groove 24 or 26. Although the embodiments of the invention which are illustrated in the figures and described herein particularly refer to a V-shaped groove, the groove is not limited to that geometric configuration. Any groove which extends across the surface of the base 20, is smaller than a cross-section of a subject optical fiber, and has a top opening slightly larger than the diameter of the optical fiber will accomplish the purpose of the invention. For example, a rectangular box-like groove or a groove which has the shape of a half cylinder would be appropriate. All of the grooves described above are configured so that the weight of a strand is sufficient to maintain the position of the strand in its resting place in the groove. A groove which is sized to accommodate strands of a certain size, as is taught by the invention, has an advantage over an arbitrarily sized groove in that the arbitrarily sized groove may be too small to allow a strand to nestle inside the groove and be secured, or may be too large to prevent undesired movement of the strand once it is placed in the groove. The further advantage of a V-shaped groove 24 or 26 is that it may accommodate a variety of sizes with ease.

Still referring to FIG. 1, a strand retaining plate 30 is placed over a strand which has been placed in the groove 24 or 26 to additionally securely hold the strand in place. The embodiment of the invention which is shown has two retaining plates, although both plates cannot be seen in FIG. 1. Only the retaining plate 30 which can be seen from the view of FIG. 1 is discussed. However, the operation of both retaining plates is the same. The manner in which the plates cooperate is discussed below. The strand retaining plate 30 is shown as having a rear surface 36 opposite a front surface 32. The front surface contacts the strand. However, as shown in this embodiment, the front surface 32 of the strand retaining plate 30 may be coated with a substance 34 to prevent the strand from being scratched, or otherwise marred or damaged. A plastic coating would achieve this purpose, and polyurethane in particular. Attached to the rear surface 36 of the strand retaining plate 30 are retaining plate support members 40 and lifting members 46. The support members 40 help maintain alignment of the plate 30 over the strand 13 which rests in the groove 24 or 26. The lifting members 46 are used to lift the strand retaining plate 30 from its resting position over the groove 24 or 26. The strand retaining plate 30 is lifted in order to insert a strand in the groove 24. The retaining plate 30 is lowered into its resting position over the grooves 24 and 26 once a strand has been properly positioned in the groove 24 or 26. The retaining plate 30, by means of the support members 40, is suspended from a retaining plate support frame 51. As shown, the support frame 51 is attached to the base 20 and extends over the grooves 24 and 26. The support members 40 extend through bores 52 in the retaining plate support frame. The support members 40 have threaded tops 42 over which nuts 44 may be screwed to prevent the retaining plate 30 from extending below the frame a desired distance. The desired distance is that distance sufficient to firmly secure the strand 13 in the groove 24 or 26 but still allow movement of the strand 13 for any additional necessary manipulation. Helical springs 45 provide a means for urging or pressing the retaining plate 30 against a strand 13 which is in place in the groove 24 or 26 of the base 20. The helical springs 45 fit over the retaining plate support members 40 between the rear surface 36 of the retaining plate 30 and the frame 51. The downward tension exerted by the helical springs 45 against the rear surface 36 of the retaining plate 30 is what urges the retaining plate 30 against a strand in the groove 24 or 26. The amount of pressure which the retaining plate 30 exerts on the strand may be modulated by varying the distance which the support members 40 extend through the frame 51. The distance is modulated by turning the support nuts in either a clockwise or counter clockwise direction. The greater the distance the support members 40 are allowed to extend from the support frame 51, the closer the contact between the retaining plate 30 and the strand 13, and the greater the pressure that the helical springs 45 are able to exert. The springs 45 maintain the support members 40 in a distended resting position.

Referring now also to FIG. 2, in addition to other features which have been discussed, the lifting member 46 is further illustrated. FIG. 2 is an elevational view of the holder 10 looking directly at its tapered end. One end of the lifting member 46 is attached to the rear surface 36 of the strand retaining plate 30. The lifting member 46 extends upwardly through the support frame 51 through a bore 54 therethrough. The strand retaining plate 30 may be lifted by grasping and lifting the lifting members 46. The lifting members 46 may be locked in the raised position through cooperation of the lifting member 46 and a locking member 48. The lifting member 46 extends through a slotted opening 49 in the locking member 48, as can be seen in FIG. 1. The slotted opening 49 has a key-hole-like appearance, with a narrow portion adjacent the opening through which the lifting member 46 may be raised and lowered. The narrow portion of the slotted opening 49 is sized to receive a narrow portion 47 of the lifting member 46. When the lifting member 46 is raised to a position wherein its narrow portion 47 slightly extends above the support frame 51, the locking member 48 may be slid over to place the narrow portion of the slotted opening 49 around the narrow portion 47 of the lifting member 46. This locks the lifting member 46, and, concomitantly, the strand retaining plate 30, in a raised positioned with respect to the top surface 22 of the base 20. A locking member handle 50 may be grasped to help move the locking member 48.

Referring now more particularly to FIG. 2, a strand 13 is shown resting in a groove 24 of the apparatus. This view illustrates the manner in which the groove 24 accommodates a strand 13 having a particular cross sectional area. As previously stated, the groove 24 is slightly smaller than the cross sectional area of the strand 13, while the top opening of the groove 24 is wider than the diameter of the strand 13. This causes the strand 13 to rest securely in the groove 24 while protruding slightly above the opening of the groove 24 and the top surface 22 of the base 20 of the apparatus 10. The strand 13 is additionally secured by placement of the strand retaining plate 30 over the groove 24 and strand 13. The helical spring 45 is a tension spring which exerts a force against the retaining plate support frame 51 and the rear surface 36 of the strand retaining plate 30. This force results in a downward exertion of pressure by the strand retaining plate 30 against the strand 13. Also, as previously stated, retaining plate support members 40 maintain alignment of the strand retaining plate 30 over the grooves 24 and 26. The retaining plate support members 40 and the lifting member 46 are attached to the rear surface 36 of the strand retaining plate 30 and are restricted to vertical movement because of the bores 52 and 54, respectively.

Referring now to FIG. 3, the cooperation of groove 24 and the strand retaining plate 30 to secure the strand 13 is illustrated. The front surface of the strand retaining plate 30, which is shown covered by a coating 34, presses down against the strand 13.

Referring now to FIG. 4, which is a front elevational view of the apparatus 10, features previously discussed are shown. In addition, two strand retaining plates 30 and 30', respectively, are shown. One strand retaining plate 30 is shown in a raised position. The manner in which the plate 30 is raised and locked in that position has been previously discussed. The other strand retaining plate 30' is shown in a lowered position. Although the apparatus may be used with one strand retaining plate, two strand retaining plates are useful to provide greater control in using the invention. In FIG. 4, the lowered strand retaining plated 30' is the rearward plate while the raised plate 30 is the forward plate. The end of a strand to be spliced extends from the forward end of the apparatus 10. Both plates 30 and 30' are raised and locked in position in preparation for insertion of a strand. Once the strand is inserted in an approximated desired position, the rearward plate 30' is lowered. The rearward plate secures the strand while still allowing the strand to be further adjusted for splicing. If desired, a user may lift slightly upon the rearward plate's 30' lifting member 46 while finely adjusting the position of the strand. Once the strand is precisely aligned, the forward plate 30 may is to more fully secure the strand.

FIG. 5 illustrates the alignment of two apparatus 10 with respect to a laser 14 which is used to splice the ends of two optical fibers 13. As shown, the apparatus 10 are properly aligned with respect to one another to assure a smooth, straight, even splice, and are also aligned with respect to the focal point of a laser beam 15.

Since maintaining the position of the entire apparatus 10 is as important as maintaining the position of strands 13 which have been placed in the apparatus 10, means may be utilized for securing the base. Securement means may be via suction cups, clamps, or other mechanical means for physically securing the base to the resting surface. An example of simple mechanical means is to screw the apparatus 10 to its resting surface. An even simpler means of securement is to weight the base 20 for the entire apparatus 10. Weighting may be accomplished by the addition of weights once a position is set or by constructing the base 20 or apparatus 10 with sufficient weight built in such that the apparatus may not be moved accidentally.

The apparatus 10 allows for quick and easy splicing of fiber strands. In a mode of operation, two apparatus 10 are placed facing each other. Each apparatus holds a strand to be spliced. On each apparatus 10, the rearward and forward strand retaining plates 30 and 30', respectively, are lifted from their respective resting positions by grasping the lifting members 46 and lifting upward to expose the grooves 24 and 26. Each plate 30 and 30' is locked in the raised position by locking members 48, as previously described. A strand 13 is placed in the groove suitable for retaining a strand of that diameter. The strand 13 is placed in a groove 24 or 26 and positioned as closely as possible in place to be spliced. The rearward retaining plate 30' is then lowered into place. After the strand 13 is more precisely aligned, the forward strand retaining plate 30 is lowered. This procedure is repeated for each apparatus 10. The two apparatus are then lined up to bring the ends of the strands 13 which protrude from each apparatus 10 into proximity to be fused. Securement of each apparatus 10 by one of the methods described above maintains each apparatus 10 in position and helps to prevent each apparatus 10 from being accidentally moved. The length of strand which extends from each apparatus 10 can be more finely adjusted by pushing or pulling the strand to adjust its length. The coating 34 on the front surface 32 of the strand retaining plates 30 and 30' prevents the strand 13 from being marred or otherwise damaged during this process. The amount of pressure which the strand retaining plate 30 exerts upon the strand can be modulated by use of the support nuts 44 which are screwed onto the threaded tops 42 of the retaining plate support members 40. Modulation allows the retaining plate 30 to exert sufficient pressure to allow the length of the extending piece of strand to be adjusted while maintaining the strand 13 securely enough such that the strands may be spliced.

It is also possible to secure two apparatus 10 in a fixed location proximate to a laser beam which will fuse or splice strands. An operator would initially determine the proper distance to align the strands at the focal point of a laser beam 15. Once the apparatus 10 are secured in that position, only the length of strand 13 extending from the apparatus 10 need be adjusted for each splicing. As a result, fibers may be quickly, easily, and repeatedly secured and aligned for laser splicing.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. An apparatus for securing optical fibers comprising:
   a base having a top surface, said top surface defining at least one groove extending across said top surface, said at least one groove having a retaining section smaller than a cross-section of the optical fiber and defining an opening slightly larger than a diameter of the optical fiber;
   a least one flat strand retaining plate spaced from the top surface of said base;
   a support frame fixedly attached to said base, said support frame including a plurality of through openings;
   at least one lifting member attached to said at least one strand retaining plate for removably placing said at least one strand retaining plate over said at least one groove;
   a plurality of support members attached for joint movement with said at least one strand retaining plate and extending completely through said openings in said support frame for allowing said at least one strand retaining plate to be removably placed over said at least one groove and for maintaining alignment of said at least one flat strand retaining plate over said at least one groove;
   bias means engaging said support frame and said retaining plate for urging said at least one strand retaining plate against said top surface of said base; and
   means mounted on at least one support member for modulating said bias means, said means limiting movement of said support member and retaining plate relative to said frame, thereby controlling the force applied by said bias means against said retaining plate.

2. The invention of claim 1, said at least one groove comprising a V-shaped groove.

3. The invention of claim 1, further comprising means for selectively preventing movement of said base.

4. The invention of claim 3, wherein said means for selectively preventing movement of said base comprises a weighted base.

5. The invention of claim 1, wherein said bias means comprises a separate helical spring surrounding each support member and compressed between a rear surface of said at least one strand retaining plate and said support frame.

6. The invention of claim 5, wherein said means for modulating comprises:
   a threaded top integrally formed upon each said support member;
   means for receiving and screwing onto each said threaded top such that a distance between said strand retaining plate and said support frame may be selectively varied by rotating said means for receiving and screwing onto each said threaded top.

7. The invention of claim 1, wherein a side of each said at least one strand retaining plate which faces said top surface of said base has a plastic coating.

8. The invention of claim 7, said plastic coating being polyurethane.

9. The invention of claim 1, comprising two strand retaining plates.

* * * * *